US008583785B2

(12) United States Patent
Slssingar et al.

(10) Patent No.: US 8,583,785 B2
(45) Date of Patent: Nov. 12, 2013

(54) SYSTEM, METHOD AND A COMPONENT FOR MONITORING BROADCAST/MULTICAST USAGE

(75) Inventors: Mike Slssingar, Skarholmen (SE); Daniel Vahlne, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 264 days.

(21) Appl. No.: 12/995,552

(22) PCT Filed: Jun. 3, 2008

(86) PCT No.: PCT/SE2008/050649
§ 371 (c)(1),
(2), (4) Date: Dec. 1, 2010

(87) PCT Pub. No.: WO2009/148368
PCT Pub. Date: Dec. 10, 2009

(65) Prior Publication Data
US 2011/0078310 A1    Mar. 31, 2011

(51) Int. Cl.
*G06F 15/173* (2006.01)
(52) U.S. Cl.
USPC .......................................... 709/224; 709/223
(58) Field of Classification Search
USPC .......... 709/203, 217, 219, 223, 224; 713/163, 713/166, 189; 725/62; 455/414.3
See application file for complete search history.

(56) References Cited

U.S. PATENT DOCUMENTS

| | | | |
|---|---|---|---|
| 7,062,658 B1 * | 6/2006 | Cheriton et al. | 713/189 |
| 7,363,643 B2 | 4/2008 | Drake et al. | |
| 2002/0116265 A1 * | 8/2002 | Hernandez | 705/14 |
| 2006/0155989 A1 * | 7/2006 | Nishimoto et al. | 713/166 |
| 2006/0206708 A1 * | 9/2006 | Son et al. | 713/163 |
| 2006/0225132 A1 * | 10/2006 | Swift et al. | 726/11 |
| 2006/0240811 A1 * | 10/2006 | De Luca | 455/414.3 |
| 2007/0067794 A1 | 3/2007 | Russell et al. | |
| 2007/0220558 A1 * | 9/2007 | Jung et al. | 725/62 |
| 2007/0274526 A1 * | 11/2007 | Wang et al. | 380/277 |
| 2007/0300265 A1 * | 12/2007 | Karkkainen | 725/62 |

FOREIGN PATENT DOCUMENTS

| | | |
|---|---|---|
| EP | 1501304 A1 | 1/2005 |
| EP | 1659736 A2 | 5/2006 |

OTHER PUBLICATIONS

European Telecommunications Standards Institute. ETSI TS 102 442-1, V1.1.1 (Nov. 2006). Satellite Earth Stations and Systems (SES); Satellite Component of UMTS/IMT-2000; Multimedia Broadcast/Multicast Services; Part 1: Services definitions. Nov. 2006.
Al-Shaer, E. et al., "MRMON: Remote Multicast Monitoring", Network Operations and Management Symposium, Apr. 19-23, 2004, pp. 585-498, vol. 1, Seoul, Korea.

* cited by examiner

*Primary Examiner* — Quang N Nguyen
(74) *Attorney, Agent, or Firm* — Coats & Bennett, P.L.L.C.

(57) ABSTRACT

A method, system and a component is provided which enables monitoring of usage statistics associated with broadcast or multicast services, distributed via a communications network. Information, such as e.g. the identity of a user client and the identity of a requested service, associated with a request for a long term key (LTK) is stored in a key management system for later retrieval. A statistics client requesting aggregated statistics associated with the information, may request such statistics from a statistics aggregation system, which is configured to compile the requested statistics on the basis of the stored information.

11 Claims, 4 Drawing Sheets

SYSTEM, METHOD AND A COMPONENT FOR MONITORING BROADCAST/MULTICAST USAGE

TECHNICAL FIELD

The present invention relates generally to a method and a system for monitoring the usage of broadcasted/multicasted services and for aggregating the monitored information into service usage statistics.

BACKGROUND

Today it is common to utilise unicast point-to-point connections for delivery of mobile and stationary IPTV services via a channel, or a part of a channel. Unicast delivery always requires that the address of the end user at the end point is known, but once the address is known the conventional unicast delivery system offers a straightforward mechanism which is easy to apply for providing usage and service monitoring. Unicast services are easy to track, mainly because this type of service is normally authenticated, authorized and logged whenever an end user makes an attempt to access it.

From an IP network point of view, both broadcast and multicast delivery offers a more efficient way of delivery of services than unicast, basically due to a more efficient utilisation of the available network resources. Broadcast/multicast services are typically encrypted to ensure delivery only to those end users that are entitled to receive a respective service, i.e. end users having the correct decryption.

There are several standards available for this type of service delivery, which are based on a key exchange mechanism, for providing a reliable way of keeping control of the service distribution, and for assuring that only those end users that are entitled to a specific service will be able to access it.

Unlike unicast delivery, a broadcasted/multicast service is by definition transmitted from one end point, and potentially received at a plurality of end points. In many applications it is useful, both from a commercial, as well as from a technical perspective, to be able to determine to what extent a service is being consumed, and, optionally also to categorise the users of the service.

A problem with the broadcast/multicast delivery solutions which are offered today is, however, how to identify when a specific service provided by a service provider is requested by an end user, not to mention the difficulty to identify a specific end user, as an end user having requested a specific service.

For a broadcast/multicast operator gathering statistics as indicated above it would, however, be desirable to avoid to involve excessive point to point unicast links, which could mitigate the advantages of running the broadcast/multicast distribution.

SUMMARY

It is an object of the present invention to address the problems outlined above. More specifically, it is an object of the present invention to provide a system and a method for monitoring usage statistics associated with broadcast or multicast services and to provide usage statistics to a statistics client requesting such statistics.

According to a first aspect a system for monitoring usage statistics associated with broadcast or multicast services and distributed via a communications network is provided. The system comprises a key management system for collecting and storing information which is associated with requests requesting a long term key, wherein each request is being received from a user client requesting a specific broadcast or multicast service.

The system also comprises a statistics aggregation system which is adapted to aggregate at least some of the stored information into usage statistics in response to a request for usage statistics from a statistics client, and to provide the aggregated usage statistics to the statistics client.

According to another aspect, also a method for monitoring usage statistics associated with broadcast or multicast services distributed via a communications network is provided. The method comprises a number of steps which are executed by a key management system.

Initially the key management system receives a request for a long term key from a user client. Since a long term key is compulsory for a user client to be able to decrypt received content the request is sent by the user client for the purpose of consuming a specific broadcast or multicast service. Subsequent to having received a request, the key management system collects and stores information associated with the request. By repeating the two mentioned steps for subsequent requests, the stored information can later be made accessible for a statistics aggregation system. The statistics aggregation system will then use a part of the stored information, to aggregate usage statistics.

Usage statistics may be requested by and provided to a statistics client. Once provided to the statistics client the usage statistics can be presented in a number of various ways.

According to yet another aspect, a service usage monitoring component for collecting information associated with broadcast or multicast services distributed via a communications network is also provided. A service usage monitoring component according to one embodiment comprises a receiver for receiving requests for long term keys from a user client. It also comprises a unit, referred to as a collecting and storing unit, for collecting information associated with each received request and for storing the collected information in a storage unit. The stored information is accessible for a statistics aggregation system where it will be used for compiling usage statistics on the basis of at least some of the stored information, and for providing the compiled usage statistics to a statistics client, which have requested the usage statistics from the statistics aggregation system.

The stored information may comprise information such as e.g. the date and/or time of reception of a request for a long term key and/or the lifetime specified for the requested long term key. Typically the stored information also comprises the identity of the requested service and/or the requesting user client.

When the usage statistics is aggregated it may also be aggregated with additional information, such as e.g. user specific information, associated with a specific user client or a user group.

The suggested system and method provides a simple way of obtaining reliable usage statistics, on the basis of established signalling procedures and present infrastructure.

By taking advantage of information which is already used for another purpose, i.e. for obtaining a long term key, when requesting for a broadcast or multicast service, a party requiring usage statistics will be provided with the option to obtain different types of usage statistics.

BRIEF DESCRIPTION OF THE DRAWINGS

The present invention will now be described in more detail by means of exemplary embodiments and with reference to the accompanying drawings, in which.

DETAILED DESCRIPTION

A broadcasted/multicasted data stream is normally encrypted, allowing only authorized end users to decrypt the broadcasted/multicasted data stream. A typical service delivery requires an end user and content server exchange of keys, resulting in an exchange of a cipher, which is used by the content server to encrypt a data stream before transmission, and by the end user to decrypt the received data stream. Such a procedure may be performed according to any known 3GPP and/or Open Mobile Alliance (OMA) standards. More information on these issues can be found in the "Mobile Broadcast Services Architecture" candidate Version 1.0, 26 Feb. 2008.

Figure 1:
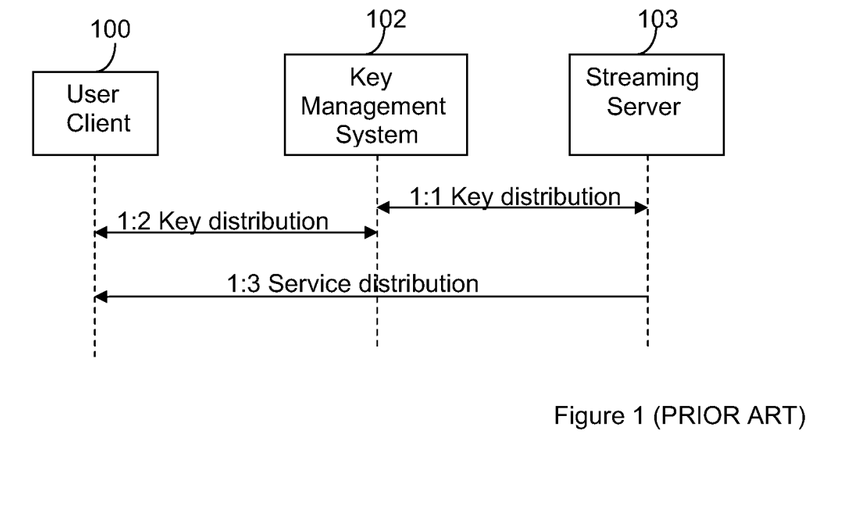
FIG. 1 illustrates a simplified signalling scheme for a user client requesting for a broadcasted service, according to the prior art.

Broadcasted/multicasted services are normally protected by a key exchange mechanism managed by a Key Management System, which has been provisioned with information about the services that will be broadcasted/multicasted, and what keys that will be needed to decrypt the service content. FIG. 1 schematically illustrates such a procedure, according to the prior art.

An end user wanting to receive services via broadcast/multicast must have a User Equipment (UE), equipped with a user client, comprising client functionality configured for this type of service delivery, including decryption functionality. In FIG. 1, such a User Equipment (UE), which may be a fixed UE or a mobile UE, is represented by User Client 100. Services to be broadcasted or multicasted are provided by a content provider (not shown) via a Streaming Server 103, comprising an encrypter (not shown). The Key Management System 102 may be located together with the Streaming Server 103, or distributed, as indicated in the figure.

A service to be broadcasted or multicasted will be encrypted with separate Short Term Keys (STK), each of which in turn is protected with a Long Term Key (LTK), specified for the particular service. A key distribution procedure between a Key Management System 102 and the Streaming Provider 103 is performed in a first step 1:1. At the streaming provider 103, a stream will be encrypted with a STK, which is in turn encrypted with a LTK belonging to the respective service, creating a STK message.

Since the message is encrypted with the LTK at the streaming server 103, also the user client 100 needs to request the LTK from the Key Management System in order to be able to decrypt a received STK message, and to retrieve the STK, that is used to decrypt the actual media stream that has been broadcasted/multicasted as a separate stream. Such a key distribution procedure is indicated with another step 1:2. Before sending the requested LTK to the user client 100, the key management system verifies that the user client is authorized to receive the requested service. In a final step 1:3, streaming server 103 delivers the encoded media stream to the user client 100, which can decode the media stream, using the LTK.

Alternatively, the system may have implemented a simplified key delivery procedure, comprising only one layer of keys. If such a key delivery procedure is used a media stream used for delivery of a service will be protected directly with the LTK. A user client will request a LTK in a similar manner as for the two key delivery procedure described before, but the user client will be able to use the LTK directly to decrypt the received media stream, and, thus, no STK's will be necessary.

For the duration of the key lifetime, specified for the LTK, the end user will be able to decrypt content of the respective service, and before the lifetime has terminated the end user has to request for another LTK, to be able to continue to decrypt the selected service. The lifetime may be configured for the purpose of specifying a required frequency for collecting associated information.

For a mobile user client a key exchange procedure operating in accordance with the described procedure may be implemented e.g. as a shared secret in a SIM card of the user equipment.

Due to the key exchange mechanism described above, the identity of an end user that has requested for relevant keys will always be known by the network, since an end user requesting for a broadcast/multicast media service will always be sending information about itself when requesting for the compulsory LTKs. By considering this information, each end user requesting for a service, and consequently also for a key, will unconditionally be uniquely identified by the network.

The present invention discloses a mechanism for retrieving information on broadcasted/multicasted service usage wherein this mechanism is based on the already existing infrastructure and signalling procedures associated with the key exchanging procedure mentioned above.

According to the detailed description following below, such a mechanism may be provided by utilising the existing LTK distribution procedure not only for encryption/decryption purposes, but also as a source of information, which can be used for providing broadcast/multicast service usage statistics.

Figure 2:
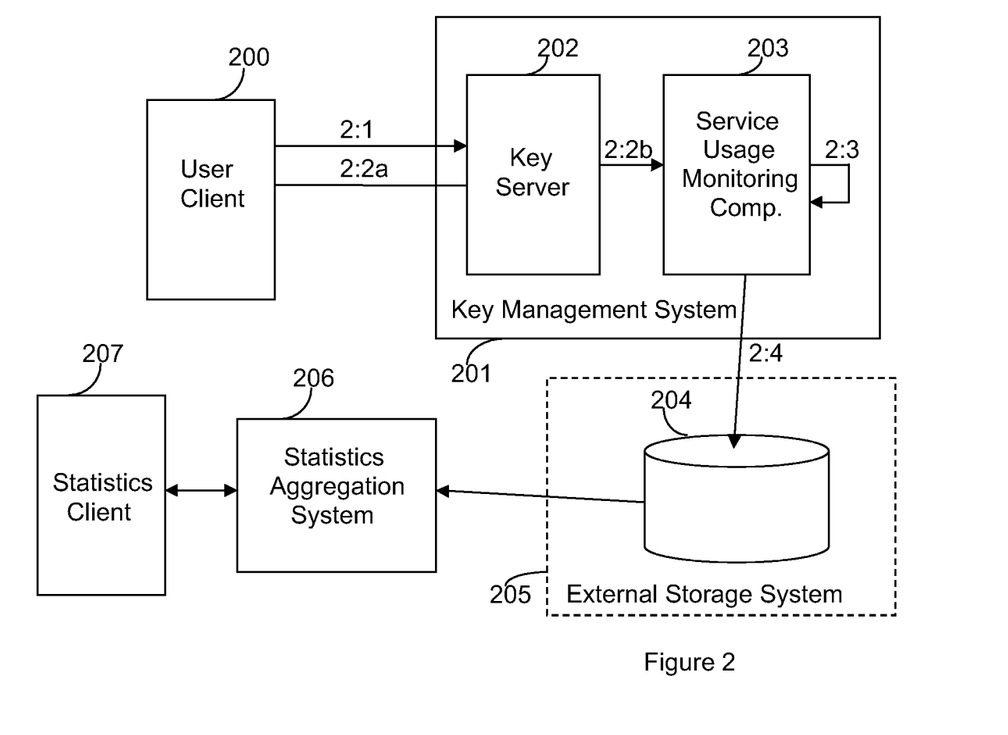
FIG. 2 is a schematic block diagram of a key management system, according to one embodiment.

The general principle of a broadcast/multicast service usage monitoring mechanism, according to one embodiment, will now be described with reference to FIG. 2. It is to be understood that FIG. 2 is a simplified, schematic block scheme, where nodes and signalling steps which may be necessary for performing a complete service session but which are not necessary for the understanding of the suggested monitoring mechanism have been omitted for simplicity reasons. The main purpose with FIG. 2 is to give a schematic picture of how a conventional key management system, which was originally developed for providing LTKs to an end user/user client, requesting for a service delivered via multicast or broadcast can be adapted so that it can continue to distribute LTKs to end users requesting for a service, parallel to obtaining and storing information which can later be used for providing usage statistics to an network operator, service provider, advertising company, or any other party requesting such statistics.

In FIG. 2 a UE of an end user comprising a user client, from now on referred to as user client 200, which may be configured as a fixed UE, such as e.g. a set-top-box (STB) or a PC, or as a mobile UE, such as e.g. a cellular telephone, wants to connect to a broadcasted or multicasted service, such as e.g. a program or an interactive service, provided by a service provider (not shown). As already mentioned, requesting for a service also automatically means requesting for at least one LTK from a Key Management System 201. Such a request is shown in the figure in a first step 2:1. In addition to activating a conventional key exchange mechanism in a Key Server 202 of the Key Management System 201, which may have been be configured according to any prior art solution, the request is also forwarded to a Service Usage Monitoring Component 203, which is introduced for the purpose of monitoring and storing information associated with the request for the LTK. According to the figure, the request transmitted in step 2:1 results in the delivery of a LTK from the key server 202 to the user client 200, as indicated in a subsequent step 2:2a, all according to prior art key distribution solutions. It is to be understood that this procedure normally includes an authentication and authorization procedure, verifying the identity of the end user/user client 200 and that the identified end user/user client has the required rights to the requested service, and, thus, to receive the associated LTK, for decryption purposes. A number of authentication and authorization procedures for use in this particular context are, however, well known, and, thus, will not be described any further in this document.

In addition to the key distribution procedure, the request is, however, also forwarded to the service usage monitoring component 203, in another step 2:2b, triggering a procedure for gathering or collecting information associated with the request, as indicated with a subsequent step 2:3. From the request the user identity, identifying the requesting end user/user client, and the service identity, identifying the requested service, is provided, while the date and the time of the incoming request, as well as the lifetime of the requested LTK, represent information that is provided by the key management system 201.

Depending on the standards and/or implementation the key management system 201 may alternatively be configured to push keys to clients, such that a user client 200 having received a first LTK may receive subsequent keys being pushed from the key management system 201, each time the present LTK has reached it's lifetime. Such a procedure may typically continue until the user client 200 requests not to receive any more LTK, i.e. upon de-registering the requested service.

In a subsequent step 2:4 the collected information is sent to an internal storage unit, or, as indicated in the figure, an external storage unit 204, of an external storage system 205, for storage. The stored information is kept in the storage unit 204 for later retrieval and processing of the information, by a Statistics Aggregation System 206, which is adapted to provide usage statistics by retrieving the stored information from the storage unit 204 and by aggregating the stored information, in response to a request for the respective usage statistics from an interested party, which in this context will be referred to as a statistics client 207.

When required, statistics client 207, will be able to activate a procedure which is configured to retrieve relevant records of the stored information and to use the required information for obtaining the requested usage statistics, which may be presented to the statistics client and used for a number of different purposes ranging from providing individual commercial offers to clients/end users to obtaining an efficient tool for network planning, such as e.g. planning of future network upgrading. If a statistics client can gain such excessive information on the usage behaviour of the user clients it may also be useful for the planning of future service deliveries, i.e. when selecting between a future simulcast or broadcast/multicast delivery for a specific service, or for a group of services. More information about the usage behaviour may also open up new possibilities e.g. for a service provider to apply targeted advertising. In addition, the retrieved information may be used also for financial purposes, such as e.g. licensing and/or charging.

Figure 3:
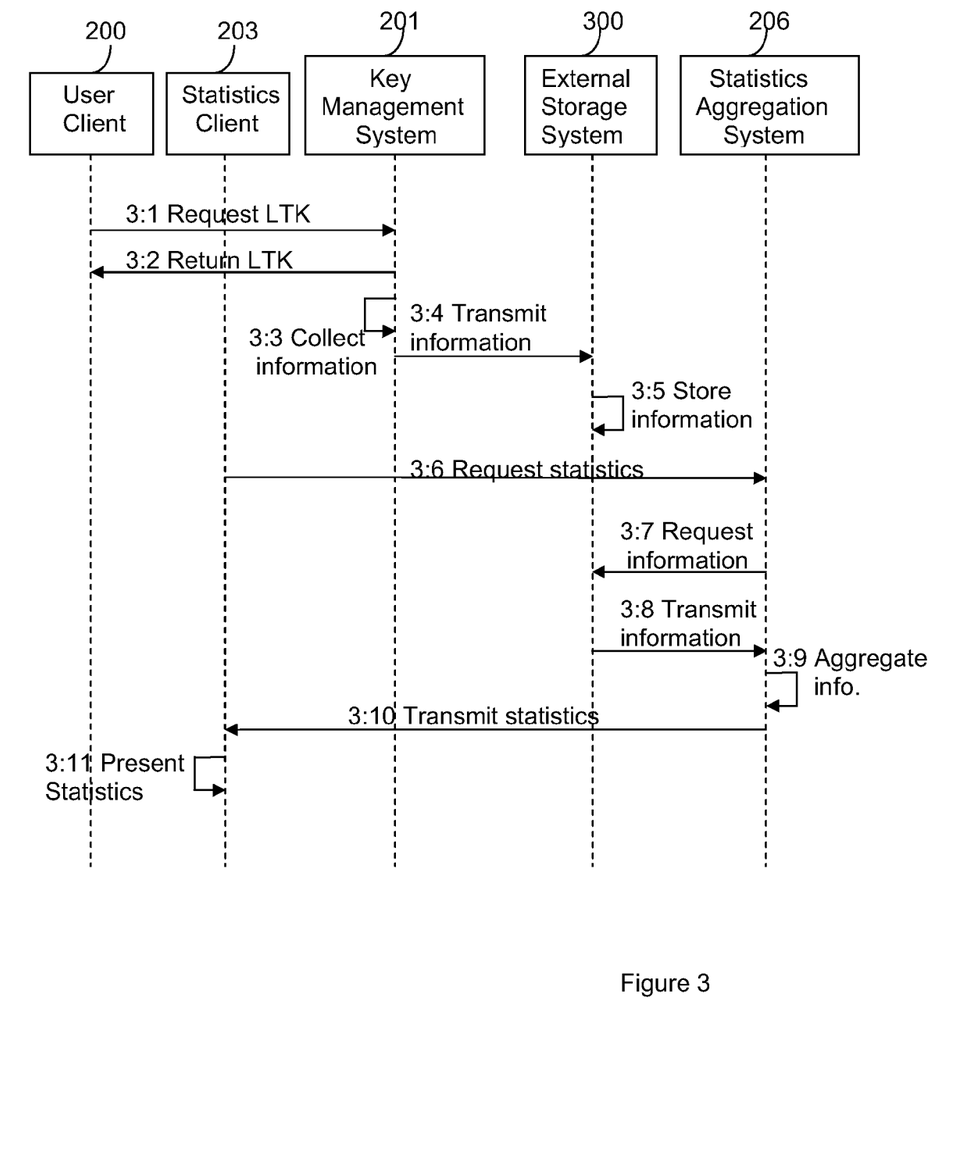
FIG. 3 illustrates a signalling scheme for a procedure for monitoring information and for aggregating and providing statistics associated with broadcast/multicast service usage to an operator, according to one embodiment.

A method for monitoring the usage of broadcasted/multicasted services and for using the collected/monitored information for aggregating usage statistics, according to one embodiment, will now be described with reference to the signalling scheme of FIG. 3. Also the signalling scheme of FIG. 3 is a simplified scheme, omitting any signalling and nodes which may be commonly used in the present context but which are not necessary for the understanding of the described method.

It is also to be understood that, although the described method normally requires information collected or monitored from a plurality of user clients for providing useful usage statistics, the figure only illustrates one user client 200 for simplicity reasons.

In a first step 3:1, a user client 200, requesting access to a specific broadcasted or multicasted service, such as e.g. a program provided from a service/content provider (not shown), is requesting a LTK from a Key Management System 201. After having performed the necessary steps (not shown) for assuring that user client 200 is authorized to get the LTK, according to any known key management procedures, the key management system 201 returns a LTK to the user client in another step 3:2.

In another step 3:3, a specific unit, in this document referred to as a Service Usage Monitoring Component (not shown), of the key management system 201 collects information associated with the request for the LTK, such as e.g. a user identity, which may be e.g. a MSISDN, if the user client is a mobile client, or a user ID, if the user client is located in a STB, and/or a service identity (service ID), identifying the requested service. The key management system may also be configured to retrieve the date and/or time of reception of the request and/or a calculated key lifetime, i.e. information which is normally generated by the key management system 201. In addition, the key management system 201 may be configured to collect additional information, which may be associated with the client/end user and/or the requested service, from one or more internal or external databases.

Next the retrieved information is stored at an internal storage means, or, as indicated with another step 3:4 in the figure, transmitted to an External Storage System 300, for storage, as indicated with a subsequent step 3:5.

Once the information, typically together with additional information associated with additional LTK requests received from a number of additional user clients, has been stored in step 3:5, a statistics client 203, such as e.g. a service provider, network provider, or any other interesting party requiring some kind of usage statistics, associated with service usage of the broadcasted/multicasted services, will be able to initiate a procedure for retrieving such usage statistics. In a typical scenario some kind of agreement has been established between the statistics client 203 and the user clients for which associated information is retrieved and stored, which authorizes the statistics client to access the stored information and to obtain the required usage statistics on the basis of this information.

In a next step 3:6, statistics client 203 transmits a request for usage statistics to a Statistics Aggregation System 206, which is adapted to aggregate or compile relevant information into usable statistics. Such an aggregation procedure may be achieved according to any known data processing solution, and, thus, the statistics aggregation system 206 will not be described in any further detail in this document. Step 3:6 may be initiated manually by authorized personnel whenever usage statistics is required, or as an automatic step, typically triggered on the basis of predefined rules specified for the statistics client 203. Such rules may e.g. be based on a timer, or triggered by any other pre-defined activity.

Upon receiving the statistics request from the statistics client 203, the statistics aggregation system 206 is configured to retrieve the relevant information from the external storage system 300, as indicated with another step 3:7. This is typically achieved by creating a search string specified for a certain category of LTK requests, according to what was requested in step 3:6. Such a search string may e.g. be specified to search for all registered and stored requests for the specific service "Super channel", received by the key management system 201 between 18:00 and 21:00 yesterday evening. If it is also of interest for the statistics client to know e.g. how many of the respective end users/user clients that are e.g. between the age of 15-25, another additional request may be sent from statistics client 203 to the statistics aggregation system 206, triggering the statistics aggregation system 206 to create another search string, adapted for retrieving this category of statistics from the information stored in the external storage system 300.

In response to any kind of user statistics request, the stored information identified with the search string is delivered to the statistics aggregation system 206 in a subsequent step 3:8. Depending on the statistics request, the statistics aggregation system 206 may also have been configured to fetch additional information, such as e.g. information about a particular user, or one or more user groups, from e.g. one or more user databases, if that is indicated in the request, sent in step 3:6. Such additional information may be based e.g. on the age, gender and/or interests of the user clients/end users.

Once provided with all information which is required for responding to the statistics request of statistics client 203, the statistics aggregation system 206 is configured to aggregate the requested statistics, as indicated with a next step 3:9. In a subsequent step 3:10, the aggregated statistics is transmitted to statistics client 203, where the statistics may be presented in a preferred manner, utilising any known technique for presentation of information, as indicated with a final step 3:11.

By processing and presenting the aggregated information according to the specific requirements indicated in the request of step 3:6, the statistics provided to the statistics client 203 may be used for a number of different purposes, such as e.g. for planning tailor made service offers, or for pricing a service. By tuning the life time of the LTK, to meet the requirements for providing an efficient monitoring of the service usage, the collection rate can be adaptable at a precision which has been considered necessary under the present circumstances, and, thus, the usage statistics may possibly make an even more reliable source for providing statistics on the consumption of services on a per user and/or on a per service basis.

In order to implement the proposed broadcast/multicast service usage monitoring mechanism, a key management system commonly used today will have to be modified according to what has been previously described with reference to FIG. 2. A generic entity, referred to as the service usage monitoring component 203, which is adapted to provide a monitoring and storing mechanism according to one exemplary embodiment will therefore now be described in more detail with reference to FIG. 4.

Figure 4:
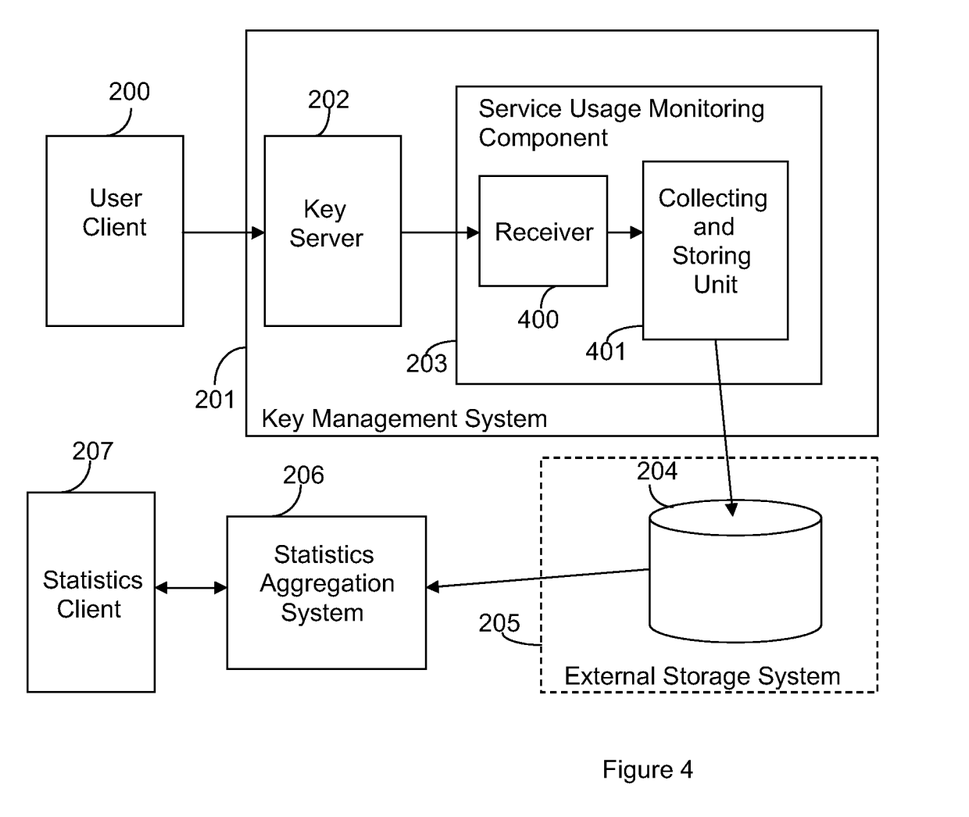
FIG. 4 is a schematic block diagram of a key management system, according to one embodiment.

FIG. 4 illustrates how a user client 200, requesting for a LTK from a key management system 201 for the purposes mentioned above, automatically initiates a monitoring and storing procedure in the key management system 201. The key management system 201 comprises a Service Usage Monitoring Unit 203, adapted to monitor each request for an LTK received by the key management system 201, and to retrieve information associated with these requests. The service usage monitoring component 203 may be configured as a separate entity, as indicated in the figure, or as an entity which is integrated with the key server 202, which, although not explicitly indicated in the figure, is configured to distribute a LTK to a requesting user client in a conventional manner. The service usage monitoring component 203 comprises a receiver 400 for receiving requests for LTKs from clients requesting for a broadcasted/multicasted service. The received request is then handled by a collecting and storing unit 401, which is adapted to collect information associated with the request, and to store the collected information in a storage unit 204, which may be a storage unit of the key management system 201 or, as indicated in the figure, a storage unit of an external storage system 205.

As indicated earlier in this document, usage statistics may at any occasion be retrieved on the basis of the information presently stored at the storage unit 401. Such usage statistics is provided from a statistics aggregation system 206, in response to a request for the usage statistics transmitted from a statistics client 207.

There are a number of possible scenarios for which the proposed method and system may be used, some of which will be described below as non limiting examples, with reference to FIGS. 5a, 5b and 5c, respectively.

Figure 5A:
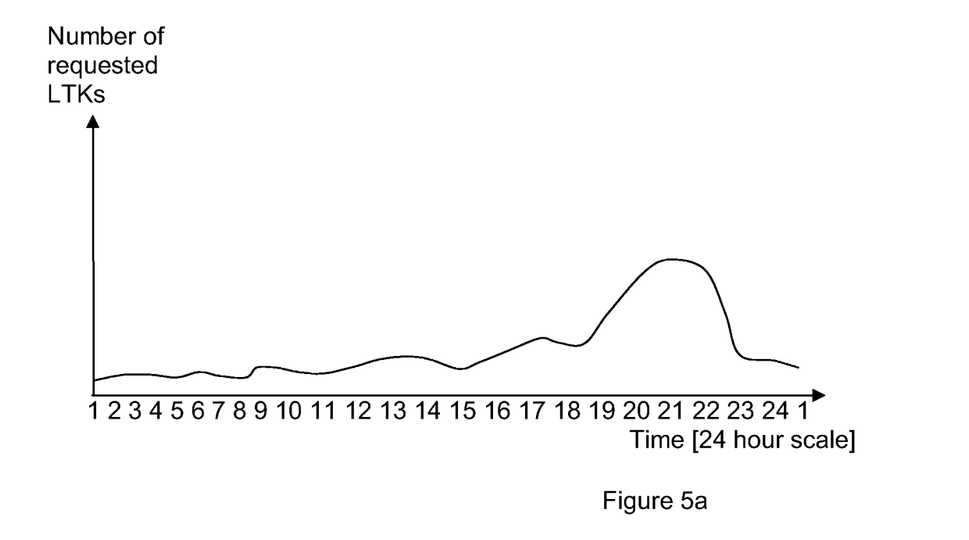
FIGS. 5a, 5b and 5c illustrates three different graphs, each displaying usage statistics which could be derived from information previously monitored and aggregated using the procedure described with reference to FIG. 3, according to three different scenarios, respectively.

According to a first exemplary scenario, illustrated in FIG. 5a, an operator, broadcasting e.g. a sports channel, is interested to know how many persons that are actually watching this specific channel, and when, during a 24 h cycle, this specific service is most popular among its spectators. By registering and storing the number of requests for LTKs, together with the date and time of reception or, alternatively, transmission of the request, as well as the lifetime of each requested key and the identity of the requested service, and by later aggregating the result with or without other relevant data in accordance with what has been described above, and by presenting the information as a graph, as indicated in the figure, the operator may be able to make better decisions e.g. as to whether he should continue to distribute the service, or whether the bandwidth could be better used for another service category.

The information about the number of registered service users may also be important information to be used e.g. when negotiating with potential advertisers, since such statistics will provide reliable statistics as to how many watchers that have actually been tuned to the sports channel on different times of the day. From FIG. 5a, showing a graph of the number of requested LTKs on a per hour basis over a 24 h scale, one can draw the conclusion that the channel under investigation is most popular in the evening between appr. 19.00 and 23.00, while the demand for this particular service has been more modest during the remaining time of the day.

Figure 5B:
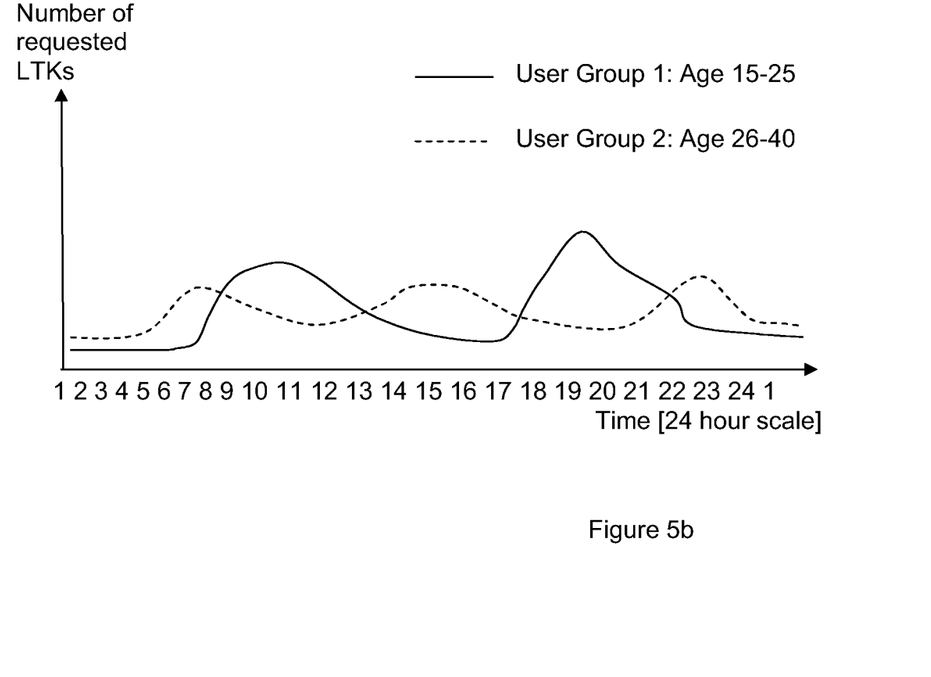

According to another scenario, illustrated in FIG. 5b, an operator is instead interested in providing statistics to be used e.g. for the purpose of achieving an efficient targeted advertising campaign. The operator may in this case be broadcasting e.g. a popular music channel, and may like to know what kind of user groups that are actually watching the music channel and on what time the different groups are tuned in to the music channel. Such user groups could be defined on the basis of e.g. on demographics and/or psycographics, and may comprise post/pre-paid user groups or different user groups having different types of subscriptions with the operator. In this specific case the operator is interested in retrieving usage statistics of user group 1, representing end users at the age of 15-25 years and user group 2, representing users at the age of 26-40 years, respectively, in order to be able to target advertisements for these particular age-groups more efficiently.

By having the key management system configured to collect specific information each time it receives a request for a LTK and to store this information, as indicated above, information necessary for providing the required statistics will be available for later aggregation.

In this case, information, such as date and time of reception of the requests, the lifetime of a requested key, an identity, identifying the requesting client, and an identifier, identifying the requested service, is collected and stored.

By later aggregating the collected information, with or without additional user specific and/or service specific information in a statistics aggregation system, the operator will be able to present the resulting statistics as one or more graphs, similar to the one illustrated in FIG. 5b. According to FIG. 5b, the music channel is most popular among its users from user group 1 between appr. 8.00 and 13.00 and between appr. 18.00 and 22:00, while the users of user group 2, which shows lover usage statistics in general, have three peaks, namely between appr. 6.00 and 10.00, between appr. 13.00 and 17.00 and between appr. 22:00 and 24:00. From the result, the operator will be able to decide how to plan for the upcoming targeted advertising campaign.

Figure 5C:
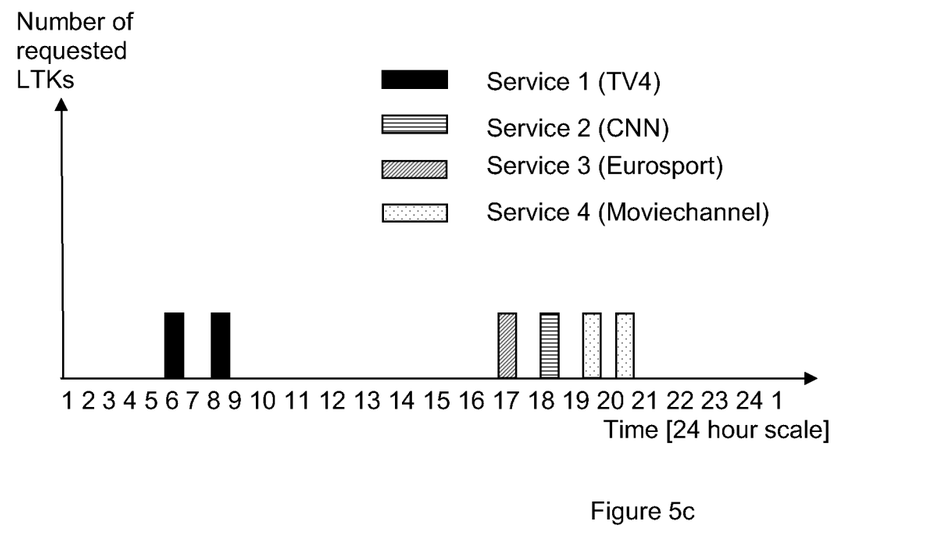

In a third scenario, described with support of FIG. 5c, an operator is requiring usage statistics which will give an indication as to how a specific end user/user client is tuned in to the different services provided by the operator, namely, TV 4, CNN, Eurosport and Moviechannel, respectively. This information can be used e.g. for targeted advertising, or for preparing specific targeted offers to the client. Also in this scenario, the statistics aggregation system is adapted to aggregate statistics on the basis of the date and time of receiving requests for LTKs, the lifetime of each requested key, the identity of the user client and the identity of the requested service, which in this case is a specific channel. According to the graph of FIG. 5c, showing the result retrieved from the aggregated usage statistics, it can be seen that the chosen user client have been watching TV4 in the morning, CNN and Eurosport in the early evening, and that Moviechannel is selected later in the evening. By collecting this type of statistics over a longer period of time, such as e.g. a week, or a month, a long term usage pattern may be recognised. Such a usage pattern may be useful e.g. when planning for targeted advertisements and/or user specific offers.

Since the user client requesting for a LTK needs to identify itself and to reveal for what service it requires a LTK, the type of information mentioned in the exemplary embodiment, as well as the scenarios described above, will always be accessible from the LTK requests.

Since each service is also protected by the unique LTK, the suggested monitoring mechanism will provide a robust and reliable way to determine which services an end user has an intention to access. By implementing this mechanism it will be possible to monitor the end users preferences as to services on a more general, as well as on a more detailed perspective, thereby enabling an operator/service provider to identify e.g. the most popular services and/or to determine how the popularity of a specific service is varying during the day, as well as to get a better picture of a specific user's consumption pattern regarding the broadcast/multicast services.

Since the broadcast/multicast service streams are always encrypted, and since the user client must acquire the relevant key in order to be able to consume a service, the processing is secured and can not be intervened or bypassed by the client.

Considering that implementation of the proposed monitoring mechanism is based on already existing infrastructure, this mechanism will also be easy to implement on different types of clients.

It is to be understood that the proposed solution may be applied both for mobile and fixed applications, making it suitable for both mobile TV and IPTV and any broadcast/multicast service that is encrypted and utilises LTKs for traditional purposes, regardless of the underlying network, supporting the delivery of the requested service. The proposed mechanism, thus, fulfils a need from network operators, content or service providers, as well as any other party which may have an interest in obtaining usage monitoring of broadcasted or multicasted services, wherein the monitoring may be broken down to individual users.

Abbreviation List

STK Short Term Key
STKM Short Term Key Messages
LTK Long Term Key
LTKM Long Term Key Message
STB Set-Top Box
MSISDN Mobile Subscriber ISDN Number

The invention claimed is:

1. A system for monitoring usage statistics associated with broadcast or multicast services distributed via a communications network, said system comprising:
   a key management system configured to collect and store information associated with requests for a long term key, said requests being received from user clients requesting a specific broadcast or multicast service, wherein said stored information comprises at least one data item provided with said long term key and comprises at least one of: the date of receiving a request for a long term key, the time of receiving a request for a long term key, or the lifetime specified for a requested long term key, and
   a statistics aggregation system configured, upon receiving a request for usage statistics from a statistics client, to:
      aggregate at least some of said stored information, along with additional user-specific and/or service-specific information associated therewith, into usage statistics; and
      provide said usage statistics to the statistics client.

2. A system according to claim 1, wherein said lifetime is a configurable lifetime adapted to specify a required frequency for collecting associated information.

3. A system according to claim 1, wherein said stored information also comprises at least one of:
   an identity identifying a service requested by a user client, or
   an identity identifying a user client requesting a service.

4. A system according to claim 1, wherein said additional information comprises at least one of:
   user information associated with a specific user client, or
   user information associated with a specific user group.

5. A system according to claim 1, wherein said statistics client is any of:
   a network provider, or
   a service provider.

6. A method implemented by a key management system for monitoring usage statistics associated with broadcast or multicast services distributed via a communications network, said method comprising:
   receiving requests for a long term key from user clients requesting a specific broadcast or multicast service, collecting information associated with each request, wherein said information comprises at least one data item provided with said long term key and comprises at least one of: the date of receiving a request for a long term key, the time of receiving a request for a long term key, or the lifetime specified for a requested long term key, and storing said information in a storage unit accessible to a statistics aggregation system configured to aggregate at least some of said stored information, along with additional user-specific and/or service-specific information associated therewith, into usage statistics.

7. A method according to claim 6, wherein the lifetime is a configurable lifetime adapted to specify a required frequency of monitoring associated information.

8. A method according to claim 6, wherein said stored information also comprises at least one of:
an identity identifying a service requested by a user client, or
an identity identifying a user client requesting a service.

9. A method implemented by a statistics aggregation system for providing usage statistics associated with broadcast or multicast services distributed via a communications network, said method comprising:
receiving a request for usage statistics from a statistics client,
retrieving information that has been collected and stored by a key management system and that is associated with one or more requests received by said key management system from a user client for a long term key, wherein said information comprises at least one data item provided with said long term key and comprises at least one of: the date of receiving a request for a long term key, the time of receiving a request for a long term key, or the lifetime specified for a requested long term key,
aggregating at least some of said received information, along with additional user-specific and/or service-specific information associated therewith, into usage statistics, and
transmitting said usage statistics to the statistics client.

10. A method according to claim 9, wherein said statistics client is any of:
a network provider, or
a service provider.

11. A service usage monitoring component for collecting information associated with broadcast or multicast services distributed via a communications network, said service usage monitoring component comprising:
a receiver configured to receive at least one request for a long term key from a user client requesting a specific broadcast or multicast service, and
a collecting and storing circuit configured to:
collect information associated with each received request, wherein said information comprises at least one data item provided with said long term key and comprises at least one of: the date of receiving a request for a long term key, the time of receiving a request for a long term key, or the lifetime specified for a requested long term key, and
store the collected information in a storage unit that is accessible to a statistics aggregation system configured to compile usage statistics based on at least some of said stored information, along with additional user-specific and/or service-specific information associated therewith, and to provide those usage statistics to a statistics client requesting the usage statistics.

* * * * *

UNITED STATES PATENT AND TRADEMARK OFFICE
CERTIFICATE OF CORRECTION

Page 1 of 1

PATENT NO. : 8,583,785 B2
APPLICATION NO. : 12/995552
DATED : November 12, 2013
INVENTOR(S) : Slssingar et al.

It is certified that error appears in the above-identified patent and that said Letters Patent is hereby corrected as shown below:

On the title page, item (75), under "Inventors", in Column 1, Line 1, delete "Skarholmen (SE);" and insert -- Skärholmen (SE); --, therefor.

In the Specification

In Column 5, Line 38, delete "it's" and insert -- its --, therefor.

In Column 8, Line 64, delete "psycographics," and insert -- psychographics, --, therefor.

Signed and Sealed this
Eighth Day of July, 2014

Michelle K. Lee
*Deputy Director of the United States Patent and Trademark Office*